US011618209B1

(12) United States Patent
Susnjara et al.

(10) Patent No.: US 11,618,209 B1
(45) Date of Patent: Apr. 4, 2023

(54) APPARATUS AND METHOD FOR DEPOSITING MATERIAL DURING ADDITIVE MANUFACTURING

(71) Applicant: Thermwood Corporation, Dale, IN (US)

(72) Inventors: Kenneth J. Susnjara, Birdseye, IN (US); Brian S. Smiddy, Newburgh, IN (US); Jonathan L. Fuquay, Boonville, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 17/656,318

(22) Filed: Mar. 24, 2022

(51) Int. Cl.
| | |
|---|---|
| *B29C 64/118* | (2017.01) |
| *B33Y 10/00* | (2015.01) |
| *B29C 64/20* | (2017.01) |
| *B29C 64/218* | (2017.01) |
| *B33Y 30/00* | (2015.01) |
| *B29K 101/12* | (2006.01) |

(52) U.S. Cl.
CPC .......... *B29C 64/118* (2017.08); *B29C 64/20* (2017.08); *B29C 64/218* (2017.08); *B33Y 10/00* (2014.12); *B33Y 30/00* (2014.12); *B29K 2101/12* (2013.01)

(58) Field of Classification Search
CPC ..... B29C 64/118; B29C 64/20; B29C 64/218; B29C 64/112; B29C 64/106; B33Y 30/00
See application file for complete search history.

(56) References Cited

U.S. PATENT DOCUMENTS

| | | |
|---|---|---|
| 5,172,326 A | 12/1992 | Campbell et al. |
| 7,731,816 B2 | 6/2010 | Oldani et al. |
| 7,810,539 B2 | 10/2010 | Mischler et al. |
| 8,151,854 B2 | 4/2012 | Oldani |
| 8,534,338 B2 | 9/2013 | Oldani et al. |
| 8,954,180 B2 | 2/2015 | Oldani |
| 9,114,453 B2 | 8/2015 | Shan et al. |
| 9,456,884 B2 | 10/2016 | Uckelmann et al. |

(Continued)

FOREIGN PATENT DOCUMENTS

| | | |
|---|---|---|
| CN | 103635305 B | 5/2016 |
| EP | 3456513 A1 | 3/2019 |

(Continued)

OTHER PUBLICATIONS

Sloan, "Big additive machines tackle large molds," CompositesWorld, Jun. 11, 2019, (8 pages).

(Continued)

*Primary Examiner* — Joseph S Del Sole
*Assistant Examiner* — Mohamed K Ahmed Ali
(74) *Attorney, Agent, or Firm* — Bookoff McAndrews, PLLC

(57) ABSTRACT

An additive manufacturing apparatus an extruder configured to receive material, a work surface extending so as to define a plane for receiving one or more layers of the material, an applicator assembly secured at a downstream portion of the additive manufacturing apparatus, a nozzle connected to the applicator assembly, the nozzle being configured to receive the material from the extruder and deposit the material on the work surface, and an actuator configured to displace the work surface in a movement direction, wherein the movement direction forms an acute angle with the plane.

20 Claims, 8 Drawing Sheets

(56) References Cited

U.S. PATENT DOCUMENTS

| | | |
|---|---|---|
| 10,548,695 B2 | 2/2020 | Uckelmann et al. |
| 2007/0044899 A1 | 3/2007 | Tingley |
| 2008/0006017 A1 | 1/2008 | Rindels |
| 2010/0194013 A1 | 8/2010 | Hall et al. |
| 2010/0200168 A1 | 8/2010 | Oldani et al. |
| 2011/0011222 A1 | 1/2011 | Bales |
| 2016/0236421 A1 | 8/2016 | Mannella et al. |
| 2016/0274565 A1 | 9/2016 | Vesco et al. |
| 2016/0288424 A1 | 10/2016 | Susnjara |
| 2016/0318248 A1 | 11/2016 | Susnjara et al. |
| 2017/0095879 A1 | 4/2017 | Mitra et al. |
| 2017/0120522 A1 | 5/2017 | Skubic et al. |
| 2017/0182698 A1 | 6/2017 | Susnjara |
| 2017/0361525 A1 | 6/2017 | Warner et al. |
| 2017/0246703 A1 | 8/2017 | Fagan |
| 2017/0255184 A1 | 9/2017 | Henning et al. |
| 2018/0029171 A1 | 2/2018 | Jackson et al. |
| 2018/0050502 A1 | 2/2018 | Oldani |
| 2018/0107193 A1 | 4/2018 | Henning et al. |
| 2018/0154475 A1 | 6/2018 | Fagan |
| 2018/0222118 A1* | 8/2018 | Susnjara ................ B29C 64/30 |
| 2018/0117898 A1 | 10/2018 | Skogsrud et al. |
| 2019/0240903 A1* | 8/2019 | Isobe .................... B29C 64/20 |
| 2020/0229905 A1 | 7/2020 | Uckelmann et al. |

FOREIGN PATENT DOCUMENTS

| | | |
|---|---|---|
| EP | 2681034 B1 | 7/2019 |
| JP | 6625717 B2 | 12/2019 |
| WO | WO 2009/012317 A2 | 1/2009 |

OTHER PUBLICATIONS

International Search Report and Written Opinion for International Patent Application No. PCT/US2018/012979, dated May 17, 2018, (15 pages).

* cited by examiner

APPARATUS AND METHOD FOR DEPOSITING MATERIAL DURING ADDITIVE MANUFACTURING

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., three-dimensional (3D) printing manufacturing techniques or processes.

BACKGROUND

Additive manufacturing techniques and processes involve the buildup of one or more materials to make a net or near net shape (NNS) object, in contrast to subtractive manufacturing methods, in which material is removed. Although "additive manufacturing" is an industry standard term (ASTM F2792), additive manufacturing encompasses various manufacturing and prototyping techniques under a variety of names, including, e.g., freeform fabrication, 3D printing, rapid prototyping/tooling, etc. Additive manufacturing techniques may be used to fabricate simple or complex components from a wide variety of materials. For example, additive manufacturing can enable the fabrication of a freestanding object based on a computer-aided design (CAD) model.

A particular type of additive manufacturing is commonly known as 3D printing. One 3D printing process, commonly referred to as Fused Deposition Modeling (FDM) or Fused Layer Modeling (FLM), includes melting a thin layer of thermoplastic material, and applying this material in layers to produce a final part. This is accomplished by passing a continuous, thin filament of thermoplastic material through a heated nozzle, or by passing thermoplastic material into an extruder, with an attached nozzle, which melts the thermoplastic material and applies it to the structure being printed, building up the structure. The heated material is applied to the existing structure in layers, melting and fusing with the existing structure to produce a solid finished part.

Two different approaches can be used to produce large parts during additive manufacturing. In a first approach, material is deposited through a nozzle that is directed downwardly onto a worktable to print the first layer. Subsequent layers are deposited over a contour defined with the first layer to produce a final, solid part. In this first approach, the nozzle is moved within a horizontal plane to trace the geometry of each layer. The worktable can move downward, away from the nozzle, after each layer is completed to provide clearance for the next layer deposited with the nozzle.

A second approach to producing large parts during additive manufacturing is to utilize a nozzle that moves in a horizontal plane as well as in a vertical plane. In this arrangement, the nozzle may move downward towards a fixed worktable, may move around the worktable to trace the geometry of the printed layer, and may move upward away from the worktable to provide clearance for the next layer.

Both of these approaches use a general method that is different than traditional net shape 3D printing. In net shape 3D printing, flowable, thermoplastic material is added in thin horizontal layers, with each new layer being fused to the material already deposited to build a final part shape layer by layer. If the layers are thin and sufficiently dimensionally accurate, a final net part shape results, which has the advantage that no additional machining or trimming is required. A disadvantage is that, because the layers are thin, many layers are required to build the part, so the process requires a significant amount of time to perform, especially on large parts. It is desirable, therefore, to reduce the time needed to perform this process, which may also decrease manufacturing costs.

One approach, commonly referred to as near net shape, involves depositing material in relatively thicker layers (compared to net shape 3D printing), which yields a final part that is slightly larger than the final net shape desired, and then to machine the part to the final net size and shape. The advantage is that this approach can be substantially faster than the thin layer approach. However, a mechanism, or a machine, to perform the trimming or machining operations is required to achieve the final net size and shape.

In 3D printing approaches that require trimming and that include a downward moving worktable, parts can be printed on one machine and trimmed on a separate machine. The requirement that vertical motion be accomplished by vertically moving the worktable, which can be large, can make trimming with the moving worktable approach impractical for machining operations.

During a manufacturing operation according to another approach, with a fixed worktable and a moving nozzle, both printing and trimming can be performed on the same machine by providing mechanisms to move the print head and the trimming head independently of each other over the same worktable. While the trimming mechanism is off the worktable, the part is printed using the printing mechanism. Once the printing is completed, the printing mechanism moves off the worktable. Subsequently, once the printing mechanism is moved off the worktable, the trimming mechanism is used to machine and trim the printed part to the final net size and shape. In this approach, the worktable can be fixed, and the printing and trimming mechanisms maneuver over the worktable.

One way to configure a machine to operate in this manner is to position the worktable in the center located near the floor and to position two walls on either side of the worktable. The top edge of the walls support linear trackways with two gantry structures that span between the walls and move on the trackways. One gantry is equipped with the printing mechanism, and the second gantry is equipped with the trimming mechanism. With this configuration, a part, up to the overall size of the worktable, can be printed using the print gantry, and then the part can be machined or trimmed to size to form a solid finished part using the trimming gantry.

In the practice of the aforementioned processes, some major disadvantages have been encountered. Both of the described printing approaches—either using a fixed or a movable worktable—share a common limitation. In each of the two described printing approaches, the maximum height of the part that can be printed is determined by the maximum number of layers that can be printed, which is limited by the height of the machine. In other words, in both approaches, the height of the part is limited to the height of a computer numeric control (CNC) machine. In order to produce long parts, tall machines are required, which is impractical due to general machine structure limitations and building ceiling height limitations.

Additionally, printing approaches can be limited in the types of parts that can be printed, based on the need to use a planar horizontal surface for the worktable, and based on the orientation of the nozzle, for example, a vertically-extending nozzle. Thus, existing methods are limited in that they may be incapable of forming parts that have enclosed hollow interiors and/or may be incapable of forming parts with inclined walls without depositing additional material that forms a support structure, this support structure being removed after the part is formed. However, the use of support structures increase material costs and complicate the process for producing a part, as an extra step of removing the supports is required. Additionally, if supports are removed improperly, the part may become damaged.

SUMMARY

Aspects of the present disclosure relate to, among other things, methods and apparatus for fabricating components via additive manufacturing, e.g., 3D printing techniques. Each of the aspects disclosed herein may include one or more of the features described in connection with any of the other disclosed aspects. An exemplary aspect of the present disclose includes a method for producing long parts without increasing the height of the machine. One or more aspects of the disclosure include a vertically oriented worktable on a wheel or slide mechanism located on top of a fixed horizontal worktable. Conveyor belts, independently movable by servomotors and gearboxes, may be located on top of at least a portion of the fixed horizontal worktable. The vertically oriented worktable is located towards an end of the conveyor belts and fixed horizontal worktable. At a front edge of the horizontal worktable there may be a chill plate, e.g., a liquid-cooled chill plate, that may cover a conveyor roller. The print mechanism may operate at a position off the front edge of the chill plate. The print mechanism may be configured to print so that each vertical layer is deposited approximately flush with the front edge of the chill plate, and each time a new layer is printed, the vertical worktable may move in a direction away from the front edge of the chill plate. With this arrangement, the print mechanism may operate off of the front edge of the worktable with a compression roller (discussed further below) positioned against the front edge of the chill plate. As this process continues, the first layer moves off the back edge of the chill plate onto a conveyor belt attached to the vertical worktable. In an exemplary version of the present disclosure, one or more conveyor belts may be attached to a bottom of a displaceable vertical worktable so that one or more conveyor belts are displaceable (e.g., slide) across a length of a horizontal worktable. In this way, the length of the horizontal worktable may be used to print a part.

The finished, solid part may then be separated from the vertical worktable and may rest on the one or more conveyor belts once the part has printed completely. The vertical worktable may then be detached from the one or more conveyor belts, moved in front of the trim area, and the trim gantry may then be used to machine the part to the desired final size and shape. In some embodiments, the vertical worktable may be removed from the machine completely, and the part may then be machined to the final size and shape. Once machining or trimming is completed, the one or more conveyor belts may be pulled back under the fixed horizontal worktable, which may transport the finished part off the front or the back of the machine. In one embodiment of the present disclosure, an apparatus for fabricating components via additive manufacturing may include a programmable CNC machine. The CNC machine may comprise a first worktable, wherein the first worktable is oriented along an x-y plane of the CNC machine, and a second worktable, wherein the second worktable is oriented along a y-z plane of the CNC machine. At least one conveyor belt may be operably coupled to the first worktable, and a printing gantry may be mounted above the first worktable. The printing gantry may be displaceable along an x-axis of the CNC machine. The CNC machine may also comprise an applicator having a nozzle configured to deliver a bead of flowable material to the second worktable.

In another embodiment of the present disclosure, an apparatus for fabricating components via additive manufacturing may include a programmable CNC machine. The CNC machine may comprise a first worktable, wherein the first worktable is oriented along an x-y plane of the CNC machine, and a second worktable, wherein the second worktable is oriented along a plane extending orthogonal to the x-y plane of the first worktable. A printing gantry may be located at a first end of the CNC machine, and the printing gantry may be displaceable along an x-axis of the CNC machine. An applicator may be mounted on the printing gantry, and the applicator may comprise a nozzle for delivering a bead of flowable material to the second worktable. A trimming gantry may be located at a second end of the CNC machine, opposite the first end, and the trimming gantry may be displaceable along the x-axis of the CNC machine. At least one conveyor belt may extend along the first worktable.

Embodiments of the present disclosure are also drawn to additive manufacturing methods. An exemplary method may comprise applying an adhesive material to a surface of a vertically oriented worktable and depositing a plurality of pellets onto the adhesive material. The method may also comprise depositing a first layer of a flowable material from a nozzle of a printing gantry onto at least some of the plurality of pellets and depositing a second layer of the flowable material from the nozzle of the printing gantry onto the first layer of flowable material. The method may also comprise moving a vertical worktable along an x-axis each time a layer of flowable material is deposited.

In one aspect, an additive manufacturing apparatus an extruder configured to receive material, a work surface extending so as to define a plane for receiving one or more layers of the material, an applicator assembly secured at a downstream portion of the additive manufacturing apparatus, a nozzle connected to the applicator assembly, the nozzle being configured to receive the material from the extruder and deposit the material on the work surface, and an actuator configured to displace the work surface in a movement direction, wherein the movement direction forms an acute angle with the plane.

In another aspect, a work surface that extends at an acute angle with respect to a horizontal direction, an applicator assembly, a nozzle connected to the applicator assembly, the nozzle defining a longitudinal axis that extends orthogonal to the work surface, and a roller configured to compress material deposited by the nozzle on the work surface.

In yet another aspect, receiving material within an extruder, heating the material within the extruder, and depositing the heated material with a nozzle on an angled surface to form a first layer of material, wherein the angled surface forms an acute angle with a horizontal direction. The method may include translating the angled surface in the horizontal direction and away from the nozzle and depositing the heated material on the angled surface with the nozzle to form a second layer of material.

As used herein, the terms "comprises," "comprising," or any other variation thereof, are intended to cover a non-exclusive inclusion, such as a process, method, article, or apparatus. The term "exemplary" is used in the sense of "example," rather than "ideal." As used herein, the term "long" will refer to a component having one dimension that is larger than the other dimensions and encompasses long, tall, wide, etc. As used herein, the terms "approximately" and "about" generally should be understood to encompass ±10% of the specified amount or value.

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated herein, and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating components via additive manufacturing techniques, such as, e.g., 3D printing. Specifically, the methods and apparatus described herein comprise a method for producing long parts without increasing the height of the machine. For example, a vertical worktable and a vertically oriented applicator assembly may be used to print long, solid 3D parts along a horizontal axis of the machine, thus, avoiding the need to increase the height of the machine. In some aspects of the present disclosure, an applicator assembly for delivering a flowable material (e.g., thermoplastic material) may be configured to deliver the material in a vertical orientation, a horizontal orientation, or an angled orientation, by changing the orientation of the deposition head from a vertical orientation, to a horizontal orientation, and/or to an angled orientation between the vertical and horizontal orientations. In doing so, the deposition head may print, for example, the flowable material onto a suitable surface (e.g., a bead board) vertically, horizontally, or at an angle, as described in detail below.

The methods and apparatus described herein may also comprise a method for producing hollow, fully-enclosed parts without the need to form supporting structures or infills. For example, an angled worktable and angled applicator assembly may be used together to deposit a plurality of layers of material on a surface that forms an angle with respect to a horizontal orientation. The deposited layers maybe be placed in a plane or series of planes that form non-zero angles with both a vertical direction and a horizontal direction. For example, each layer may form an angle of between about 10 degrees and about 80 degrees with a horizontal direction.

The applicator assembly may secure a nozzle at an angle with respect to this horizontal plane such that the nozzle is also angled with respect to vertical and horizontal directions during a portion of a printing process or during an entirety of a printing process. In the interest of brevity and clarity, the methods and apparatus are described in connection with the fabrication of parts from thermoplastic materials. However, the disclosed apparatus and methods may be used with any material suitable for additive manufacturing, and, in particular, any material that is heated so as to provide a flowable material to a nozzle or other opening for deposition.

Figure 1:
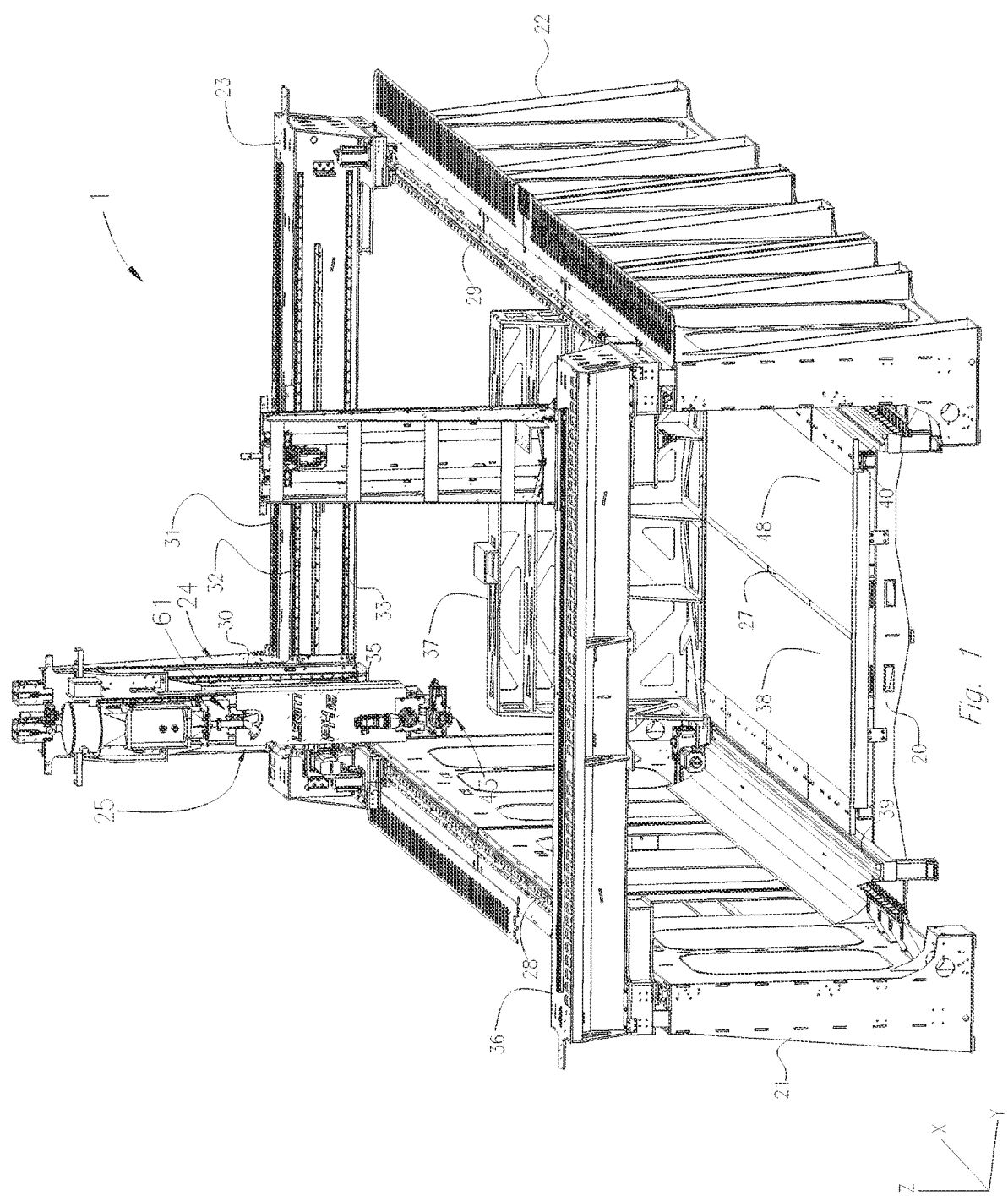
FIG. 1 is a perspective view of an additive manufacturing system that includes an exemplary additive manufacturing apparatus, according to one or more aspects of the present disclosure.

With reference to FIG. 1, there is illustrated an additive manufacturing apparatus 1, such as a CNC machine, according to aspects of the present disclosure. A controller (not shown) may be operatively connected to additive manufacturing apparatus 1 for displacing an application nozzle 51 along a first horizontal, or longitudinal, line of travel (x-axis), a second horizontal, or transverse, line of travel (y-axis), and a vertical line of travel (z-axis), in accordance with a program inputted or loaded into the controller for performing an additive manufacturing process to form a desired component. In some examples, the program may be inputted or loaded into the computer for forming long 3D printed components and for controlling apparatus 1 to perform each of the functions and methods described herein. Additive manufacturing apparatus 1 may be configured to print or otherwise build 3D parts from digital representations of the 3D parts (e.g., AMF and STL format files) programmed or loaded into the controller.

For example, in an extrusion-based additive manufacturing system, a 3D part may be printed from a digital representation of the 3D part in a layer-by-layer manner by extruding a flowable material. The flowable material may be extruded through an extrusion tip or nozzle 51 carried by a print head or applicator assembly 43 of the system. The flowable material may be deposited as a sequence of beads or layers on a substrate in an x-y plane when apparatus 1 is configured for horizontal printing. In some examples, the x-y plane may be used for printing long parts without increasing the height of the machine. The extruded, flowable material may fuse to previously deposited material and may solidify upon a drop in temperature. The position of the print head relative to the substrate may then be incrementally advanced along a z-axis (perpendicular to the x-y plane), and the process may then be repeated to form a 3D part resembling the digital representation. By using a vertical worktable and suitable mounting plate, as described below, apparatus 1 may instead be configured for vertical printing (depositing material within a y-z plane). In some aspects, additive manufacturing apparatus 1 may be configured to deposit materials in a plane other than an x-y plane and other than a x-z plane or y-z plane. This may enable production of a hollow part without forming support structures, as described below.

Additive manufacturing apparatus 1, shown in FIG. 1, may include a bed 20, a pair of transversely spaced side walls 21 and 22, a printing gantry 23, and a trimming gantry 36 supported on opposing side walls 21 and 22, a carriage 24 mounted on printing gantry 23, a carrier 25 mounted on carriage 24, an extruder 61, and applicator assembly 43 mounted on carrier 25 at a downstream portion of additive manufacturing apparatus 1 (e.g., a portion of apparatus 1 that is downstream of an extruder with respect to a flow of material to nozzle 51 or other structure for depositing material). Located on bed 20 between side walls 21 and 22 is a horizontal worktable 27 provided with a support surface. The support surface may be disposed in a horizontally-extending plane (e.g., an x-y plane), and may be fixed or displaceable along an x-axis and/or a y-axis. For example, in a displaceable version, horizontal worktable 27 may be displaceable along a set of rails mounted on bed 20. Displacement of horizontal worktable 27 may be achieved using one or more servomotors and one or more rails 39 and 40. In an exemplary configuration, rails 39 and 40 may be mounted on bed 20 and operatively connected to horizontal worktable 27 so as to allow horizontal worktable 27 to translate along the x-axis.

Printing gantry 23 and trimming gantry 36 may be disposed along a y-axis, supported on side walls 21 and 22. In FIG. 1, printing gantry 23 and trimming gantry 36 are shown mounted on a set of guide rails 28 and 29, which are located along a top surface of side walls 21 and 22, respectively. Printing gantry 23 and/or trimming gantry 36 may be fixedly mounted or displaceably mounted. In some aspects, printing gantry 23 and trimming gantry 36 may be disposed so as to be displaceable along an x-axis. Printing gantry 23 and trimming gantry 36 may be displaceable by a set of servomotors (not shown) mounted on printing gantry 23 and trimming gantry 36. Gantries 23 and 36 may each be operatively connected to tracks, e.g., guide rails 28 and 29 provided on side walls 21 and 22 of bed 20. In an exemplary displaceable configuration, one or more servomotors may control movement of printing gantry 23 or trimming gantry 36, or movement of both gantries 23 and 36.

Carriage 24 may be supported on printing gantry 23. Carriage 24 may be provided with a support member 30 that is mounted on and displaceable along one or more guide rails, such as guide rails 31, 32, and 33 on printing gantry 23. Carriage 24 may be displaceable along a y-axis on one or more guide rails 31, 32, and 33 by a servomotor mounted on printing gantry 23 and operatively connected to support member 30. Carrier 25 may be mounted on one or more vertically disposed guide rails 35 supported on carriage 24 for displacement of carrier 25 relative to carriage 24 along a z-axis. Carrier 25 may be displaceable along the z-axis by a servomotor (not shown) mounted on carriage 24 and operatively connected to carrier 25. Vertical worktable 37 may be attached to conveyor belts 38 and 48. As shown in FIG. 1, vertical worktable 37 may be located on top of horizontal worktable 27, and may be displaceable along the x-axis (e.g., by sliding along rails 39 and 40) by one or more servomotors (not shown) connected to vertical worktable 37 and operatively connected to tracks, e.g., guide rails 39 and 40 provided on the top of bed 20. In some example, guide rails 39 and 40 may be located adjacent bed 20 or along the sides of bed 20. In an exemplary displaceable configuration, one or more servomotors may control movement of conveyor belts 38 and 48 so that conveyor belts 38 and 48 may be operated to turn in the same direction to advance vertical worktable 37 along the x-axis.

Figure 2:
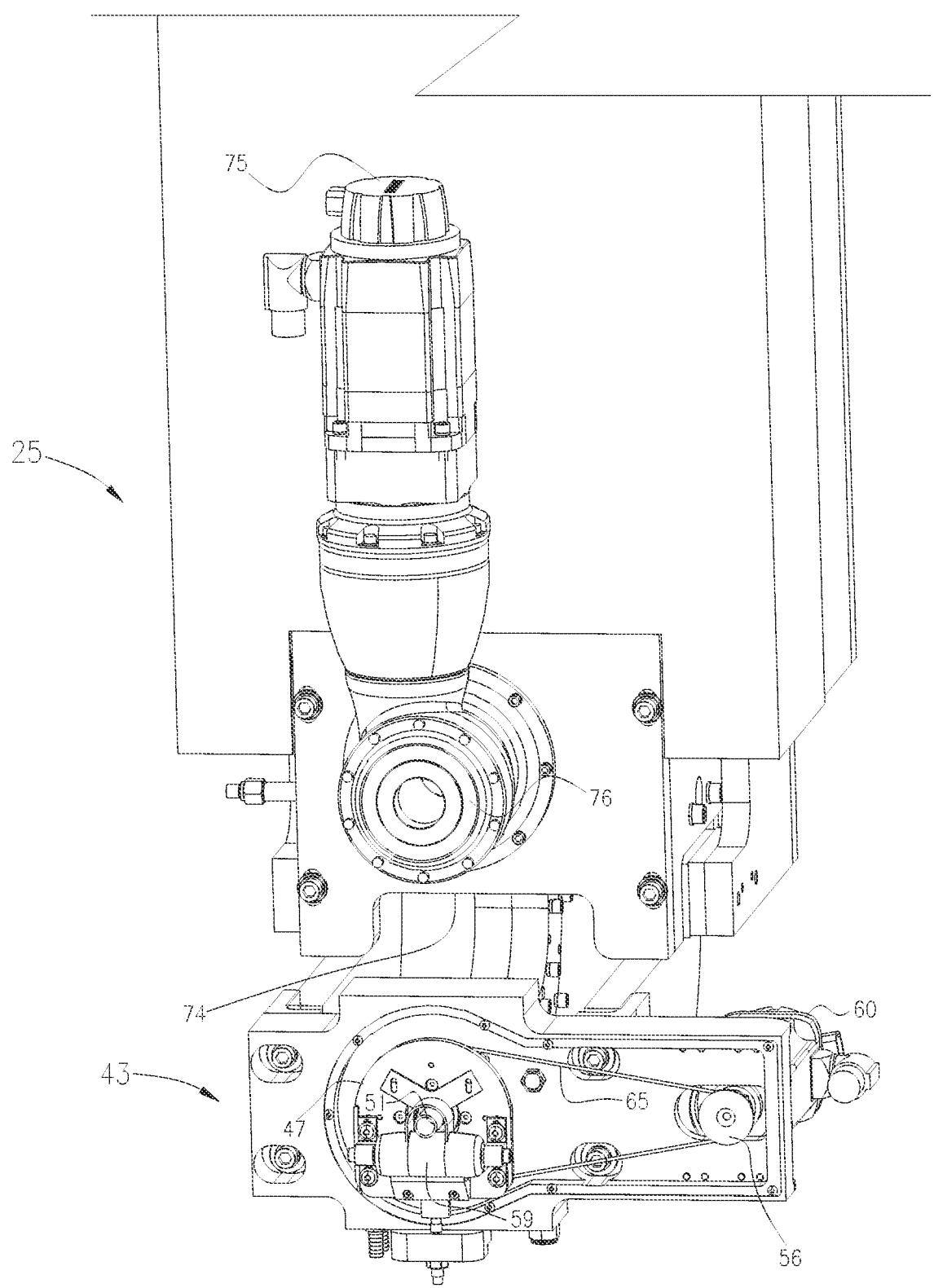
FIG. 2 is an enlarged perspective view of an exemplary applicator assembly, according to one or more aspects of the present disclosure.

As best shown in FIG. 2, mounted to carrier 25 is a positive displacement gear pump 74, which may be driven by a servomotor 75, through a gearbox 76. Gear pump 74 may receive molten plastic from extruder 61, shown in FIG. 1. A compression device such as bead shaping roller 59, for compressing material, may be mounted on carrier bracket 47. Compression roller 59 may be movably mounted on carrier bracket 47, for example, rotatably or pivotably mounted. Roller 59 may be mounted so that a center portion of roller 59 is aligned with nozzle 51. In some examples, roller 59 may be oriented tangential to nozzle 51. Roller 59 may be mounted relative to nozzle 51 so that material, e.g., one or more beads of flowable material (such as thermoplastic resin), discharged from nozzle 51 are smoothed, flattened, leveled, and/or compressed by roller 59. One or more servomotors 60 may be configured to move, e.g., rotationally displace, carrier bracket 47 via a pulley or sprocket 56 and drive-chain or belt 65 arrangement, or by any other suitable means.

Figure 3:
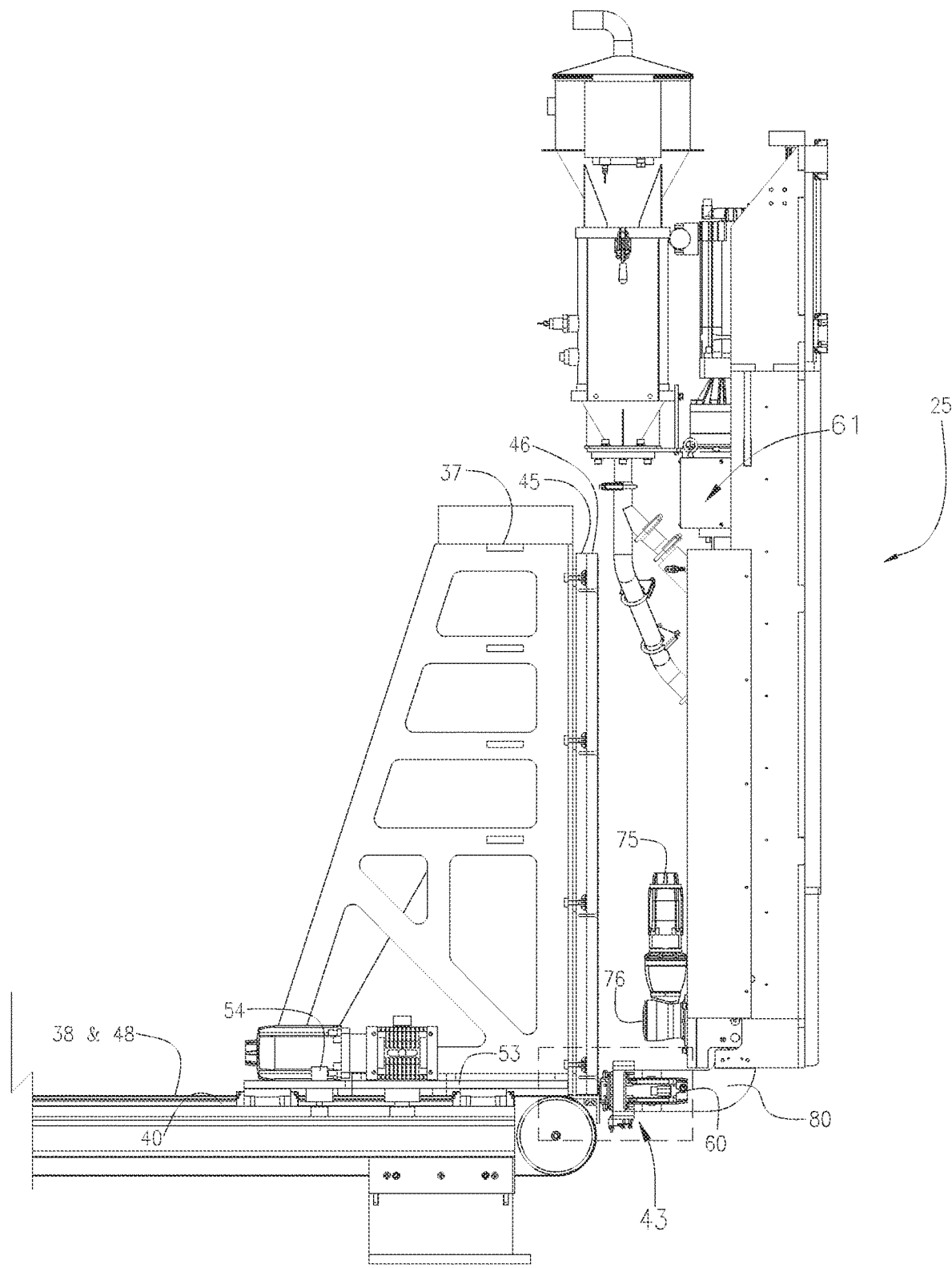
FIG. 3 is a side view of an exemplary vertical worktable and applicator assembly according to one or more aspects of the present disclosure.

With reference to FIG. 3, additive manufacturing apparatus 1 (which may form a machine for manufacturing long parts without increasing the height of the machine, and/or a machine for depositing material at one or more predetermined angles) may include vertical worktable 37 operatively connected to rails 39 and 40. Rails 39 and 40 (rail 39 not shown in FIG. 3) may be located on top of fixed horizontal worktable 27, as shown in FIG. 1. In some examples, vertical worktable 37 may be operably connected to one or more independently-actuated servomotors and gearboxes configured to cause vertical worktable 37 to translate along the x-axis and along rails 39 and 40.

Additive manufacturing apparatus 1 may include one or more applicator assembly mounting plates 80 configured to secure applicator assembly 43 to carrier 25. Applicator mounting plates 80 may include a bend or series of bends such that applicator assembly 43 extends in a direction that is offset by about 90 degrees from a vertical direction along the z-axis. Thus, nozzle 51 may extend in a horizontal direction (FIG. 2) due to a bend formed in plates 80.

Conveyor belts 38 and 48 may be secured to a bottom of vertical worktable 37. Conveyor belts 38 and 48 may be operatively connected to vertical worktable 37 to advance a partially-formed or fully-formed 3D printed part along the x-axis. In an exemplary displaceable vertical worktable 37, conveyor belts 38 and 48 may be used to produce a long 3D printed part without increasing the height of apparatus 1, by rolling the desired printed part along the surface of conveyor belts 38, 48 mounted on horizontal worktable 27 during operation of machine 1. During operation of machine 1, the long dimension of the printed part may be manufactured along a long axis of conveyor belts 38 and 48 so that conveyor belts 38 and 48 may move the part as additional flowable material is added to further print the part.

Conveyor belts 38 and 48 may be comprised of stainless steel or other suitable material and may include a suitable coating. In an exemplary version, a bottom surface of conveyor belts 38 and 48 may be coated with a polytetrafluoroethylene coating, a non-stick coating, TEFLON® (a registered trademark owned by Chemours), or other suitable material. Exemplary coatings may be friction-reducing and may facilitate sliding of conveyor belts 38 and 48 across horizontal worktable 27.

Secured to a longitudinal surface of vertical worktable 37 is a base plate 45 and a bead board 46 which form a vertically-extending plane on which material may be deposited by a nozzle of additive manufacturing apparatus 1. Base plate 45 may first be secured to vertical worktable 37. Thereafter, bead board 46 may be secured to a surface of base plate 45. Base plate 45 and/or bead board 46 may be securely mounted to each other or secured to vertical worktable 37 using a combination of bolts, fasteners, tee-nuts, screws, adhesive, or any other suitable securing devices, as shown in FIG. 3. In some examples, base plate 45 may be formed from plywood, or other suitable material or combination of materials. In an example, bead board 46 may be a piece of substructure, e.g., of medium density fiberboard (MDF), or high grade plywood, or any other suitable material.

Figure 4:
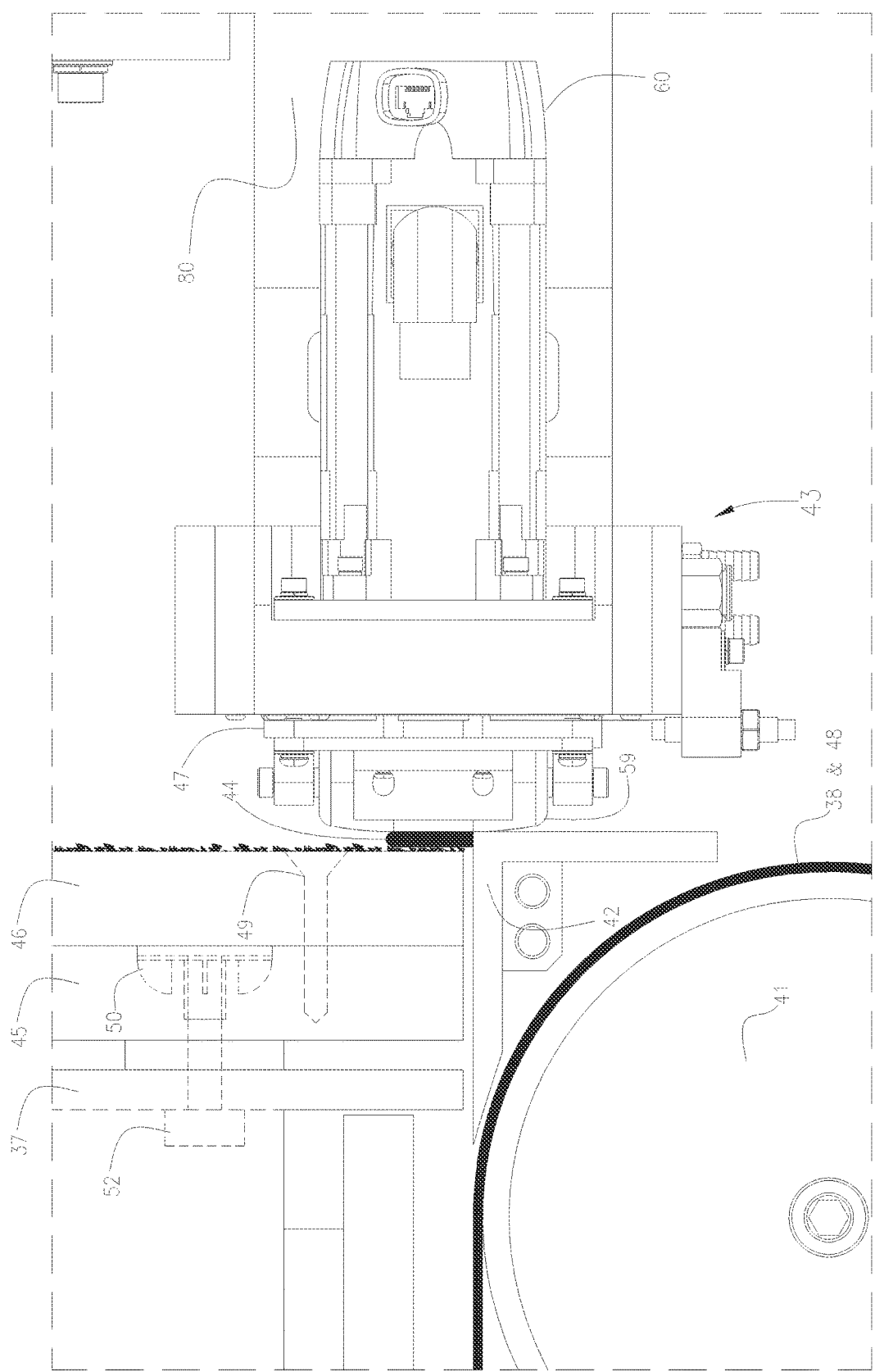
FIG. 4 is an enlarged side view of the exemplary vertical worktable and applicator assembly of FIG. 3.

In some embodiments, bead board 46 may have one side at least partially covered in adhesive or a bonding layer, e.g., a glue or other suitable material, and infused with thermoplastic beads pellets, as shown in FIG. 4. While board 46 is referred to as a "bead" board, the beads being formed by thermoplastic pellets in one or more configurations, it is understood that material placed on board 46, such as thermoplastic material, may have shapes other than beads or pellets. For example, bead board 46 may include a plurality of regular or irregular shapes, such as particles, spheres, fibers, linear tracks, curved tracks, or any combination of these, either alone or with beads or pellets. These materials may be thermoplastic, or another type of material that is compatible with the material deposited via nozzle 51. The application of adhesive and thermoplastic beads or pellets be performed before printing of the part has initiated (i.e., before a first layer of thermoplastic material is placed on bead board 46). The adhesive infused with thermoplastic pellets may create a weak bond between the printed part and bead board 46 so that, once printing is completed, or when trimming is completed, upon application of sufficient force, the glue bond may be broken, separating the completed printed part from the substructure, e.g., separating the printed part from bead board 46 of vertical worktable 37.

In one or more exemplary configurations, a surface of bead board 46 may be coated with adhesive or bonding layer. The bonding layer may be comprised of an adhesive, a liquid, a liquid adhesive, or a settable liquid. The bonding layer may comprise a polyvinyl acetate glue (or any other suitable adhesive), may be first applied to the surface of bead board 46, before beads or pellets are introduced to board 46. For example, adhesive material or glue may be applied to bead board 46 by a brush, a roller, or one more spray nozzles. The pellets, as shown in deposited form in FIGS. 4 and 6, may be of any suitable material. For example, in one or more embodiments, pellets may be made of thermoplastic material. The pellets may be deposited on the adhesive material such that at least a portion of each pellet is within or on the adhesive material so that the pellets are secured to the adhesive material (and to bead board 46) when the adhesive material cures or otherwise sets. Pellets may be deposited in any suitable uniform or non-uniform pattern.

When the adhesive material sets, individual beads or pellets may become bonded to the surface of the bead board 46. Any loose pellets may be removed in any suitable manner. For example, loose or otherwise unsecured thermoplastic pellets may be removed via suction by a shop grade vacuum cleaner or other suitable device. The resulting prepared pellet bed may extend along the path of the first layer of flowable material, e.g., thermoplastic material, to be printed, as shown in FIG. 4. In an exemplary version, the prepared pellet bed including thermoplastic beads of bead board 46 may be used to break away a finally formed article, or 3D printed part, as described above, from vertical worktable 37.

During operation of additive manufacturing apparatus 1, when a first layer of molten thermoplastic material is deposited onto the layer of bonded pellets of bead board 46, one or more beads of hot deposited material may fuse to the pellets, holding the printed layer of material firmly in place. The adhesive layer, or glue, may remain at least slightly pliable after curing and may soften and become more pliable when heated by the application of molten thermoplastic material. Accordingly, the individual pellets may be free to move by an amount sufficient to impede the development of stress between the initial thermoplastic bead(s) and the adhesive layer. In other words, as a first layer of heated molten thermoplastic material is applied over the prepared pellet bed, the adhesive layer softens, thus, allowing pellets to move and create a weak attachment to bead board 46. Correspondingly, the tendency for the final printed part to distort may be significantly reduced. After the printed structure is cooled, force may be applied to the printed part to break the glue bond between the printed part and bead board 46, separating the final printed part from the substructure, e.g., bead board 46 of vertical worktable 37, without damaging the part.

The aforementioned process may create a suitable surface for printing a desired article or 3D printed part. This surface may, in at least some embodiments, reduce the amount of stresses induced into the part as the part or article cools and solidifies (e.g., due to the presence of pellets and/or adhesive).

During operation of additive manufacturing apparatus 1, a molten bead 44 of flowable material (e.g., molten thermoplastic) may be placed under pressure from a source disposed on carrier 25 with extruder 61. Bead 44 may travel through positive displacement gear pump 74 by use of servomotor 75 and gearbox 76. Pump 74 may drive heated and flowable material to a vertically-oriented applicator 43 and through nozzle 51, as shown with reference to FIGS. 2 and 3. Vertically oriented applicator 43 may be fixedly or removably connected to, and in fluid communication with, nozzle 51.

As shown in the enlarged view in FIG. 4, when molten bead 44 leaves applicator 43 through nozzle 51 (as shown in FIG. 2), molten bead 44 may be applied to vertically-extending bead board 46 attached to vertical worktable 37. Roller 59 may compress molten bead 44 once the bead of thermoplastic material is deposited on the surface of bead board 46. Bead 44 may rest on top of chill plate 42. For example, a front edge of chill plate 42 may be located approximately flush with a front edge of molten bead 44 (e.g., chill plate 42 may be within a distance of 0.5 cm or less from the front of at least a portion of bead 44). Chill plate 42 may be used to cool molten bead 44 so that bead 44 does not stick to or bond with a horizontal supporting surface of vertical worktable 37 and/or conveyor belts 38 and 48. Chill plate 42 may be used to cool a bottom surface of a formed part during operation of machine 1. Chill plate 42 may cool the formed part until the part is sufficiently solidified, such that when a portion of the part contacts one or both conveyor belts 38 and 48, the part is rigid and does not sag and/or drag on worktable 27. Chill plate 42 may also be used so that a formed part is adequately suspended above worktable 27 by at least a thickness of conveyor belts 38 and 48.

Chill plate 42 may be used to create a flat, straight corner where the printing will occur. Chill plate 42 may also be used to cover a conveyor belt roller 41 to prevent any unwanted, uncooled thermoplastic material from molten bead 44 from entering the machinery associated with or around conveyor belt roller 41. During operation of additive manufacturing apparatus 1, conveyor belt roller 41 may be configured to move or advance one or both conveyor belts 38 and 48.

In an exemplary configuration of chill plate 42, active cooling (e.g., by providing plate 42 with coolant) may permit the printing of flowable material, e.g., thermoplastic material, at temperatures that may otherwise be too hot for conveyor belts 38 and 48 to tolerate, and may enable faster printing. After the first layer of thermoplastic material is applied, and prior to depositing the next layer, vertical worktable 37 and conveyor belts 38 may 48 move away from applicator assembly 43, which may be vertically-oriented, by a distance equal to a thickness of one layer of molten bead 44. This process may be repeated for every additional layer of molten bead 44 deposited by vertically-oriented applicator assembly 43, via nozzle 51, by the use of one or more servomotors and gearboxes. This process may continue until the desired printed article or part, which may be as long as the full length of horizontal worktable 27 (with reference to FIG. 1), is finished. In some aspects, the part may be longer than horizontal worktable 27. For example, conveyor belts 38 and 48 may move the partially formed part at least partially off of horizontal worktable 27 so that printing may continue.

The finished printed article or part may be detached from vertical worktable 37. The printed part maybe detached from vertical worktable 37 in one or more processes. For example, one or more screws 49, bolts/fasteners 52, and/or tee-nuts 50 may be placed on a surface of vertical worktable 37, base plate 45, and/or bead board 46 to securely mount vertical worktable 37 to base plate 45 and bead board 46 to base plate 45, as shown in FIG. 4. Screws 49 or bolts/fasteners 52 may be placed so as not to be covered by the printed part, and arranged so as to attach the bead board 46 to base plate 45 as shown. Screws 49, fasteners 52, and tee-nuts 50 may be of a size that is close enough to the desired printed part so as to not to interfere with the trimming operation.

Base plate 45 and bead board 46 may be made from a thick (e.g., 1/14 inch or 0.18 cm thick) wood-based material (e.g., plywood, MDF, etc.). Holes in vertical worktable 37 may be used to attach base plate 45 to vertical worktable 37 using tee-nuts 50. Bead board 46 may also be attached to base plate 45 using screws 49 (e.g., dry wall screws). Although the location of screws 49 may vary, in some embodiments, screws 49 may be located as close to where the part will be printed as possible, but not so close so that screws 49 would contact the trimming tool of trimming gantry 36 during the trimming operation. Moreover, screws 49 may be positioned far enough away from the intended location of the printed part so that screws 49 may be removed without removing the printed part from bead board 46. This may allow bead board 46 to be separated from base plate 45 with the printed part attached after printing.

In some examples, base plate 45 may be removably attached to vertical worktable 37 and/or removably attached to bead board 46. One of ordinary skill in the art may appreciate that any other suitable means may be used to fixedly or removably secure vertical worktable 37 to base plate 45 and to secure bead board 46 to base plate 45. In some examples, bolts/fasteners 52 may be threaded into tee-nuts 50 or bolts/fasteners 52 in base plate 45 and removed from a back side of vertical worktable 37.

In some examples, vertical worktable 37 may be detached from conveyor belts 38 and 48 in order to remove a finished, solid part from CNC machine 1. Conveyor belts 38 and 48 may be attached to an edge of vertical worktable 37, such as a back, bottom edge of vertical worktable 37. Conveyor belts 38 and 48 may extend from the back, bottom edge to the end of additive manufacturing apparatus 1, where conveyor belts 38 and 48 may wrap around a conveyor belt roller. Conveyor belts 38 and 48 may then extend underneath a length of additive manufacturing apparatus 1 from one end to the other end of apparatus 1, where conveyor belts 38 and 48 may wrap around a second conveyor belt roller. Conveyor belts 38 and 48 may then extend along a top surface of horizontal worktable 27 to the bottom, front edge of vertical worktable 37, where it is attached to vertical worktable 37. In other words, conveyor belts 38 and 48 may be attached at opposite ends of vertical worktable 37 and may wrap around horizontal worktable 27.

A cross plate 53, as shown in FIG. 3, may be displaceable by one or more servomotors and/or gearboxes. Vertical worktable 37 and conveyor belts 38 and 48 may be attached to and displaceable along cross plate 53. As an alternative, vertical worktable 37 and conveyor belts 38 and 48 may instead be attached to and displaceable along the z-axis of trimming gantry 36. The finished, solid part may be removed from additive manufacturing apparatus 1 by either moving cross plate 53 or the z-axis of trimming gantry 36, which, in turn, may move conveyor belts 38 and 48 to transport the finished, solid part off of additive manufacturing apparatus 1, e.g., off either side of additive manufacturing apparatus 1.

Once detached from vertical worktable 37, the weight of the finished, solid part may hold the part in place for trimming by trimming gantry 36. The finished part may be removed from additive manufacturing apparatus 1, for example, using an overhead crane or a hoist attached to the bottom of printing gantry 23 and/or trimming gantry 36.

In some examples, cross plate 53 may be used to attach conveyor belts 38, 48 to vertical worktable 37. Cross plate 53 may be fixed, e.g., bolted, to one or more drive mechanisms, which may be located on each side of additive manufacturing apparatus 1. Vertical worktable 37 may be removed from cross plate 53 while keeping ends of conveyor belts 38 and 48 attached to cross plate 53. Conveyor belts 38 and 48 may be detachably secured to cross plate 53 so that cross plate 53 may be unbolted from the machine (e.g., drive mechanism on each side of machine 1). In removing cross plate 53, access to additive manufacturing apparatus 1 may be improved, if necessary.

During operation of additive manufacturing apparatus 1, as the final printed part rests on conveyor belts 38 and 48, vertical worktable 37 may be unbolted or removed from conveyor belts 38 and 48. The printed part or article may then be moved to the front of additive manufacturing apparatus 1 behind the trimming area and below or near trimming gantry 36 (FIG. 1) by actuating conveyor belt roller 41 to advance conveyor belts 38 and 48 to move the final part in a direction away from printing gantry 23 and towards trimming gantry 36. Subsequently, trimming gantry 36 (FIG. 1) may be operated to machine or trim the part to a desired final size and shape. During operation of additive manufacturing apparatus 1, in some embodiments, vertical worktable 37 may be completely removed from CNC machine 1, and trimming gantry 36 may be used to machine or trim the part to the desired final size and shape. Once the part machining or trimming is complete, the trimmed, final part may be conveyed off the front or back end of horizontal worktable 27 by conveyor belts 38 and 48 or may be lifted or otherwise removed from CNC machine 1.

Figure 5:
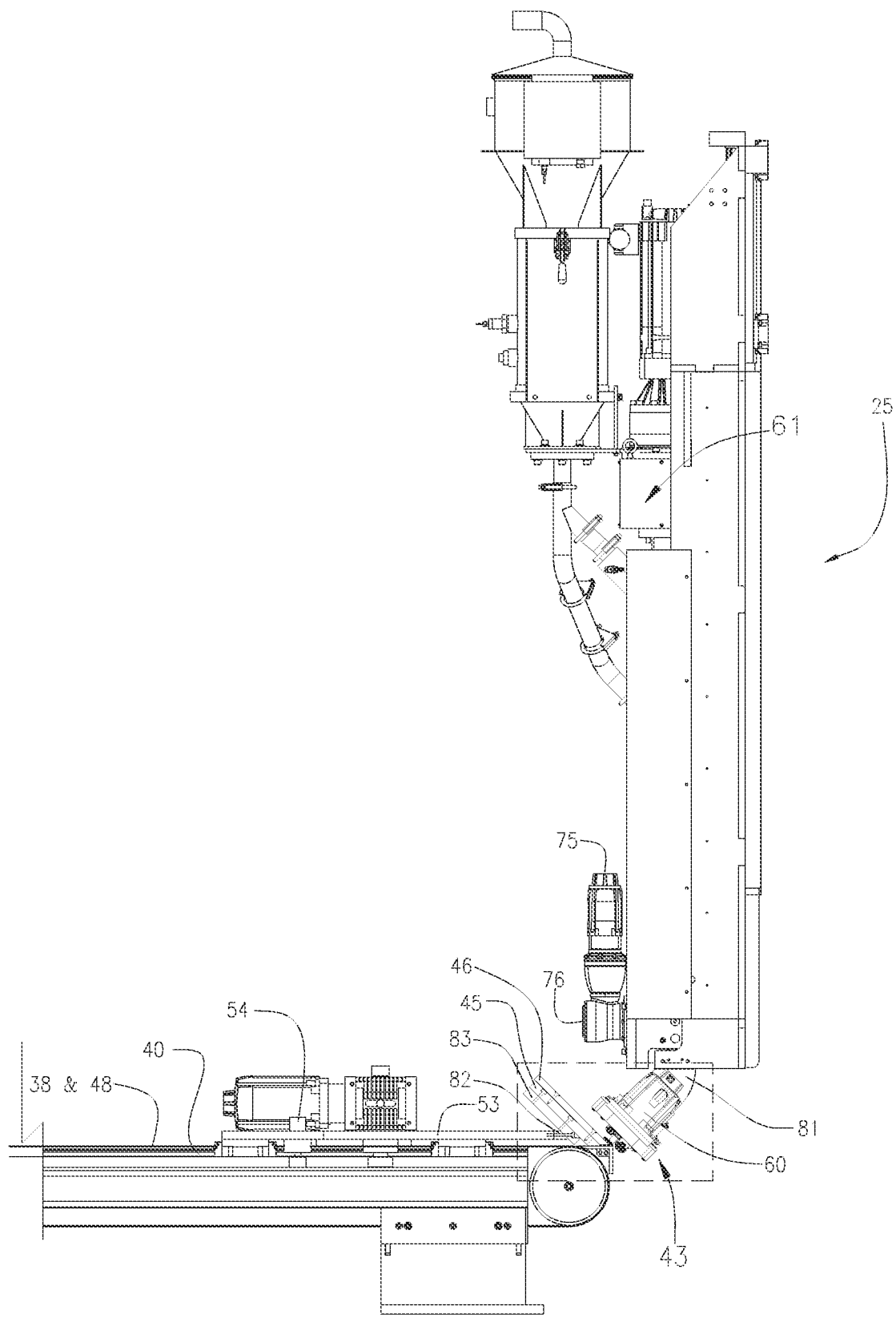
FIG. 5 is a side view of an exemplary angled worktable and additive manufacturing apparatus including an angled mount according to one or more aspects of the present disclosure.

With reference now to FIG. 5, additive manufacturing apparatus 1 may be operated in an additional method of layer-by-layer printing, in which printing is performed at an angle, as opposed to horizontal printing (depositing material from a vertically-extending nozzle) and vertical printing (depositing material from a horizontally-extending nozzle). In some aspects, this printing may be performed at an angle between about 10 degrees and about 80 degrees with respect to a horizontal direction. Angled printing may include depositing a plurality of layers on each other, one or more of these layers (or all layers) extending within a plane that forms a non-zero angle with respect to a horizontal direction and a non-zero angle with respect to a vertical direction. In particular, angled printing may be performed such that material is deposited at an angle of about 45 degrees with respect to a horizontal direction.

Additive manufacturing apparatus 1 may be configured for performing angled printing by first removing 90-degree applicator mounting plates 80, as discussed above with respect to FIG. 3. Mounting plates 80, once removed, may be replaced with angled (e.g., about 10-degree to about 80-degree) mounting plates 81. In the example shown in FIG. 5, mounting plates 81 are 45-degree mounting plates 81 that angle nozzle 51 downwards such that nozzle 51 presents a longitudinal axis 71 that forms an approximately 45-degree angle with respect to a horizontal direction. In other configurations, longitudinal axis 71 of nozzle 51 may extend through an opening of nozzle 51 so as to form an angle of about 10 degrees to about 80 degrees, about 20 degrees to about 70 degrees, about 30 degrees to about 60, or about 40 degrees to about 50 degrees, as measured with respect to a horizontal direction.

In addition to connecting angled mounting plates 81, configuring additive manufacturing apparatus 1 for angled printing may include removing vertical worktable 37 (FIG. 3), if present, from base plate 53. When vertical worktable 37 is separated from base plate 53, base plate 53 may be configured to receive an angled plate, such as table plate 83. For example, table plate 83 may be connected with a fastener, such as a bolt, to base plate 53. In the configuration shown in FIGS. 5 and 6, angled table plate 83 may be secured to base plate 53 together with an angled block 82 that is bolted or otherwise fastened to the front of base plate 53. In some aspects, table plate 83 and base plate 45 may, once connected to cross plate 53, form a desired angle with respect to a horizontal axis (e.g., the above-described x-axis or a direction parallel to the x-axis, such as direction 72). In some aspects, the angle that table plate 83 and/or base plate 45 form with a horizontal axis may correspond to the angle of nozzle 51. For example, table plate 83 and/or base plate 45 may form an angle of 90 degrees with an axis defined by nozzle 51, such that axis 71 of nozzle 51 extends orthogonal to an angled plane 70 defined by board 46. For example, when nozzle 51 forms an angle of 30 degrees with respect to a horizontal axis, board 46 may form an angle of about 60 degrees with respect to the horizontal axis.

Figure 6:
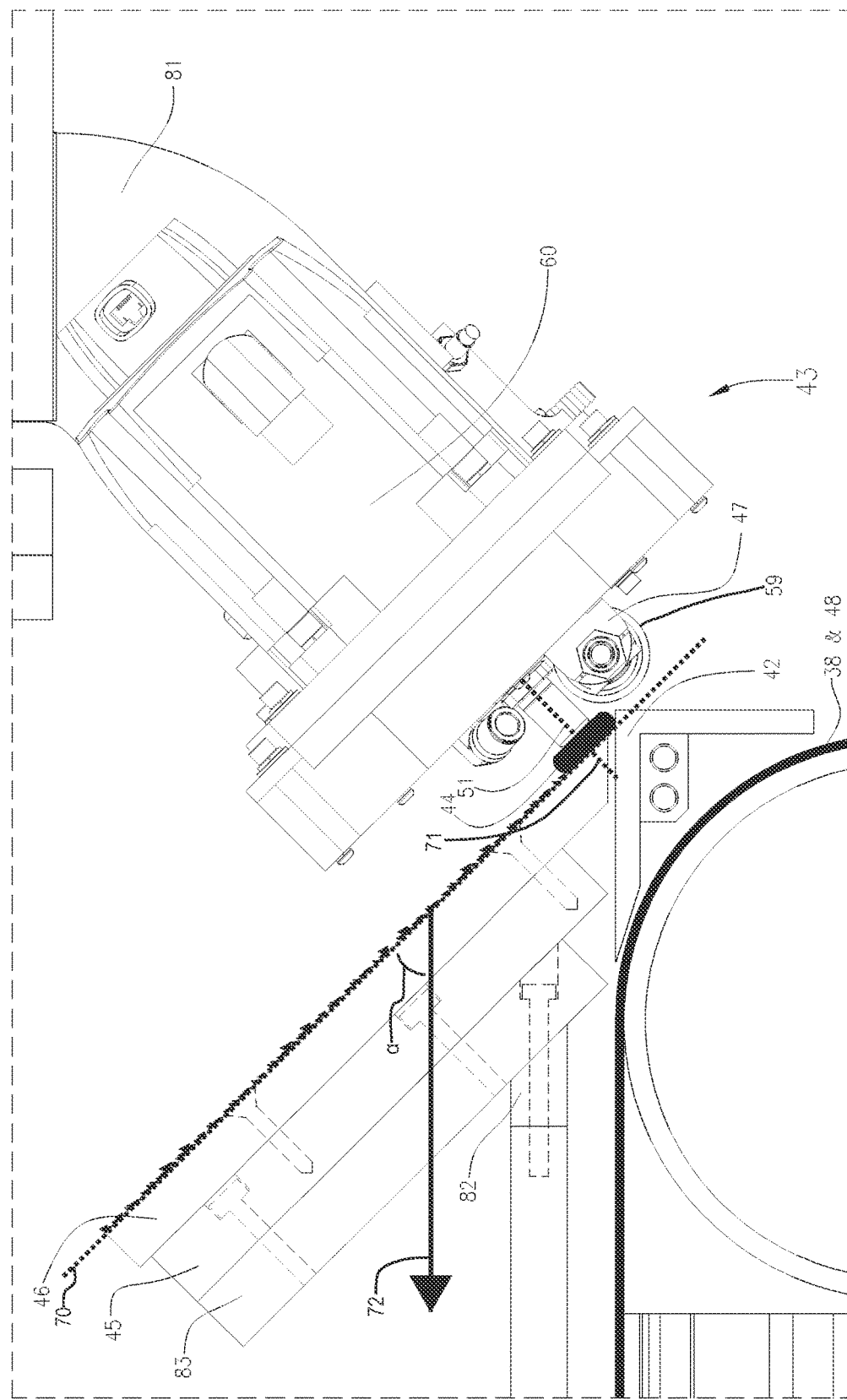
FIG. 6 is an enlarged side view of an exemplary angled worktable and angled applicator assembly of FIG. 5.

In the configuration illustrated in FIGS. 5 and 6, bead board 46 is attached to a base plate 45, which in turn, is bolted to table plate 83 to connect bead board 46 to cross plate 53. Bead board 46 may be presented at an angle α, when secured in this manner. Alternatively, bead board 46 may be angled at angle α by connecting bead board 46 directly to cross plate 53 or to table plate 83.

Angle α may be defined by plane 70 and a horizontal direction, such as a movement direction 72 along which a part may be drawn away from applicator assembly 43. In some embodiments, angle α may be an acute angle, and in particular, an approximately 45-degree angle. Angle α may be about 10 degrees to about 80 degrees, about 20 degrees to about 70 degrees, about 30 degrees to about 60, or about 40 degrees to about 50 degrees. Angle α may be measured from a horizontal axis, such as movement direction 72, upward towards an upper portion of plane 70, as shown in FIG. 6.

Thus, printing may be performed at an orientation that is different than a vertical orientation in which a deposition surface (e.g., a worktable) extends vertically for use with a horizontally-extending nozzle 51, and at an orientation that is different than a horizontal orientation in which a deposition surface extends horizontally for use with a vertically-extending nozzle 51. As shown in FIG. 6, additive manufacturing apparatus 1 may instead define a work surface that extends in angled plane 70. For example, this work surface may be configured to receive a bead 44 of material from nozzle 51. This surface may be, for example, a front surface of bead board 46 that extends in angled plane 70. As understood, due to the presence of thermoplastic beads or pellets, some portions of the front surface of bead board 46 may extend at different heights (e.g., above or below plane 70). Thus, the use of the word "plane" is not limited to flat surfaces, but also surfaces having regular or irregular protrusions, valleys, etc.

An actuator (e.g., a servomotor, as described above) may be configured to translate or otherwise displace bead board 46 in movement direction 72, which may correspond to a horizontal direction. This horizontal direction may be aligned with or parallel to the above-described x-axis.

As shown in FIG. 6, molten bead 44 may be deposited with applicator assembly 43 through the nozzle 51 by applying bead 44 to bead board 46. When bead 44 is deposited on board 46, board 46 may be attached to angled base plate 45, on top of table plate 83 and angled block 82. A bead shaping roller 59 may be configured to follow nozzle 51 and compress bead 44 while bead 44 is supported on board 46. As shown in FIG. 6, bead 44 may rest on top of a liquid-cooled chill plate 42 that includes a horizontally-extending flat surface. Chill plate 42 may be flush or approximately flush with the front edge of bead 44 and adjacent to a bottom edge of board 46. Thus, bead 44 may be cooled by chill plate 42 while also being supported on the surface of board 46.

Figure 7:
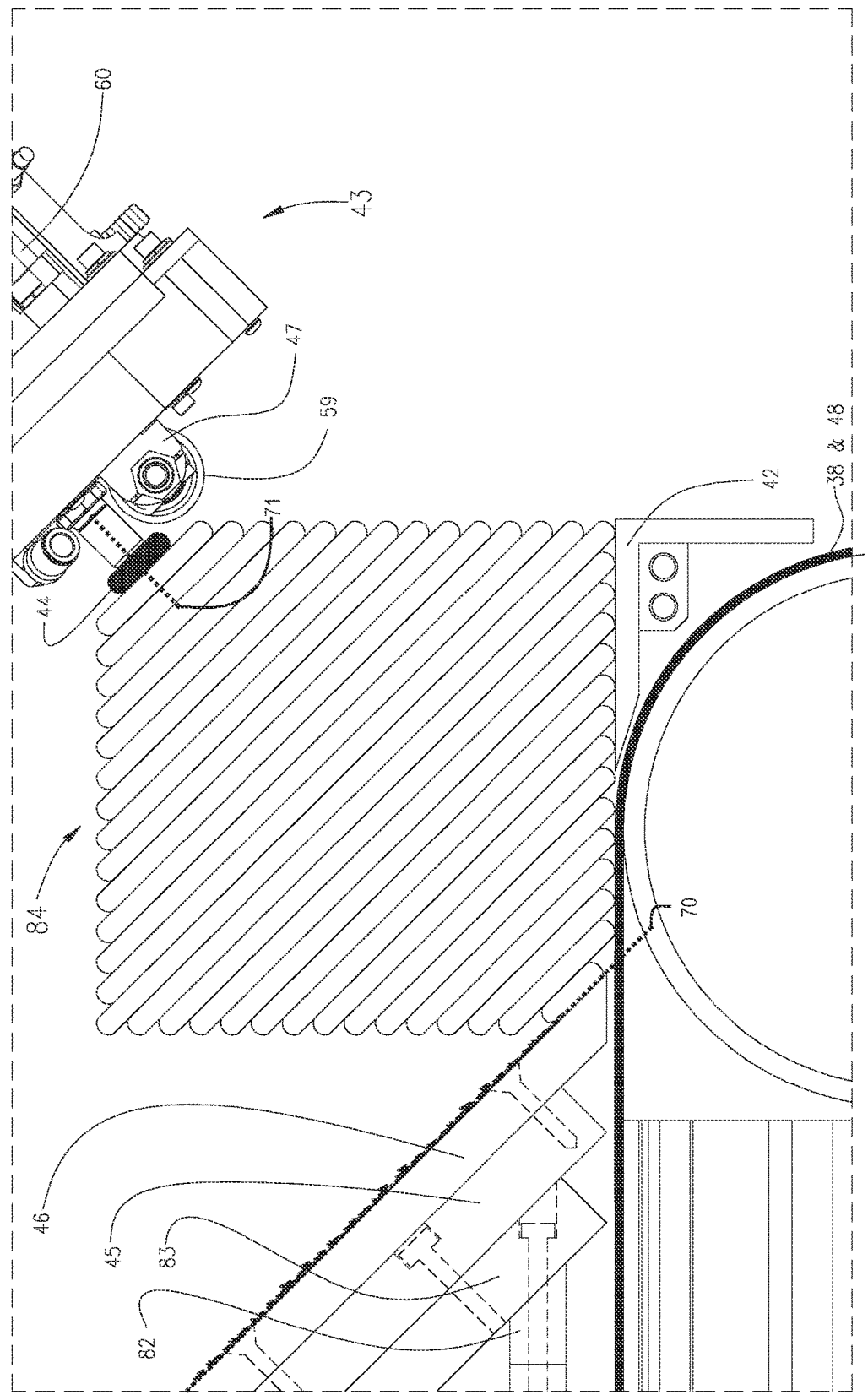
FIG. 7 is an enlarged side view of an exemplary angled worktable and angled applicator assembly of FIG. 5 after depositing a plurality of layers of material, according to one or more aspects of the present disclosure.

Once bead 44 is deposited on board 46 (e.g., forming a part of a layer or an entire layer of a part), bead 44 may be pulled backwards by bead board 46. For example, bead board 46, with one or more attached beads 44 of thermoplastic material, may be drawn in movement direction 72 away from applicator assembly 43. This may be accomplished with an actuator (e.g., one or more of the above-described servomotors) that moves deposited material to conveyor belts 38 and 48, as shown in FIG. 7. Conveyor belts 38 and 48 may convey the part backwards away from the applicator assembly 43, in a layer by layer manner, during printing. As shown in FIG. 7, one or more layers deposited with nozzle 51 may contact chill plate 42, which may increase a rate at which each angled layer of material cools.

When apparatus 1 is configured for vertical layer printing with nozzle 51 extending in a vertical direction, apparatus 1 may be configured to deposit material so as to form a wall with a maximum angle about 45 degrees. Therefore, it may be difficult to produce parts having certain shapes, such as parts that form a hollow enclosed box shape, without the aid of artificial structure or other supports. In order to facilitate printing such structures, apparatus 1 may be configured for angled, e.g., 45 degree, printing. Angled printing in this manner may enable the production of parts, such as a box or other hollow enclosed shapes, that can be printed without the addition of any artificial structures, including supports that are placed below the part, including supports deposited with additive manufacturing apparatus 1. Thus, additive manufacturing apparatus 1 may be capable of printing an enclosed structure without depositing material to form a support.

In the example illustrated in FIG. 7, a part may be deposited as a plurality of individual layers formed with beads 44 to form hollow box 84. Box 84 may be printed with a hollow interior and a plurality of angled layers by using the angled printing configuration of additive manufacturing apparatus 1. In particular, layers of box 84 maybe be deposited at an angle of about 45 degrees by use of an angled surface, such as bead board 46, and an angled nozzle 51. In the side view of FIG. 7, box 84 may be a relatively small hollow box in which the final layer is printed at a corner of the box. While FIG. 7 illustrates an exemplary part in the form of a small rectangular box, as understood, additive manufacturing apparatus 1 and board 46 may be capable of depositing material to form parts with significantly larger sizes and different shapes. Regardless of the particular size and shape of the part, the part may be conveyed over the cooling chill plate 42 and on to the conveyor belts 38 and 48 during the printing process, as can be seen in FIGS. 6 and 7.

Figure 8A:
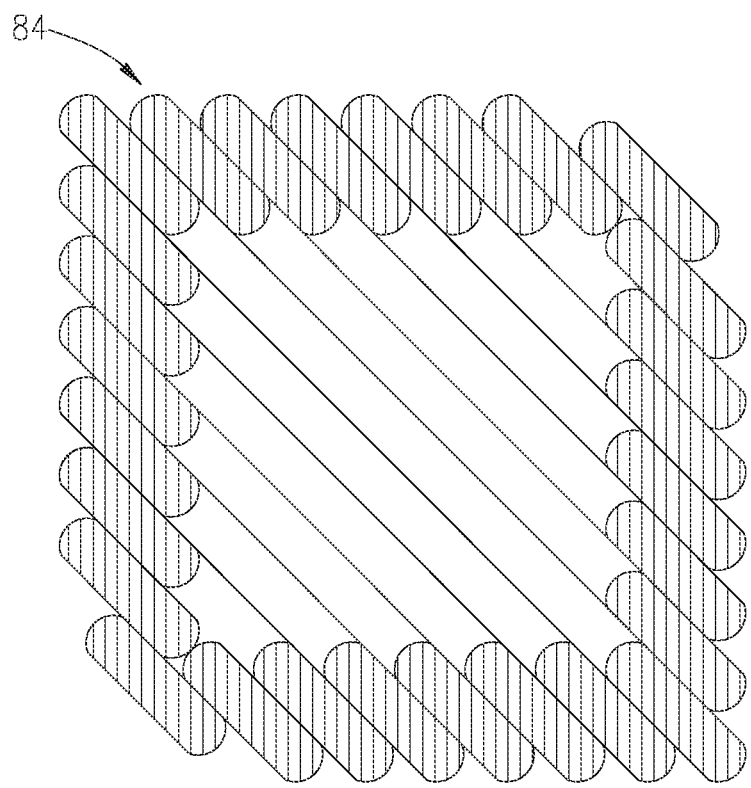
FIG. 8A is a cross-sectional view of a layer of the a deposited on an angled worktable, according to one or more aspects of the present disclosure.

FIG. 8A is a cross-sectional view of hollow box 84, showing the hollow interior extending within box 84, including a center of box 84, the hollow interior being formed when printing at an angle such as 45 degrees (or alternatively, any suitable angle as described above above). While box 84 in FIG. 7 is illustrated as including 29 layers of material, FIG. 8A illustrates a box 84 formed with 15 layers. As understood, a part formed by angled printing with additive manufacturing apparatus 1 may include more layers, or fewer layers, as compared to either of the exemplary parts illustrated in FIGS. 7 and 8A.

Figure 8B:
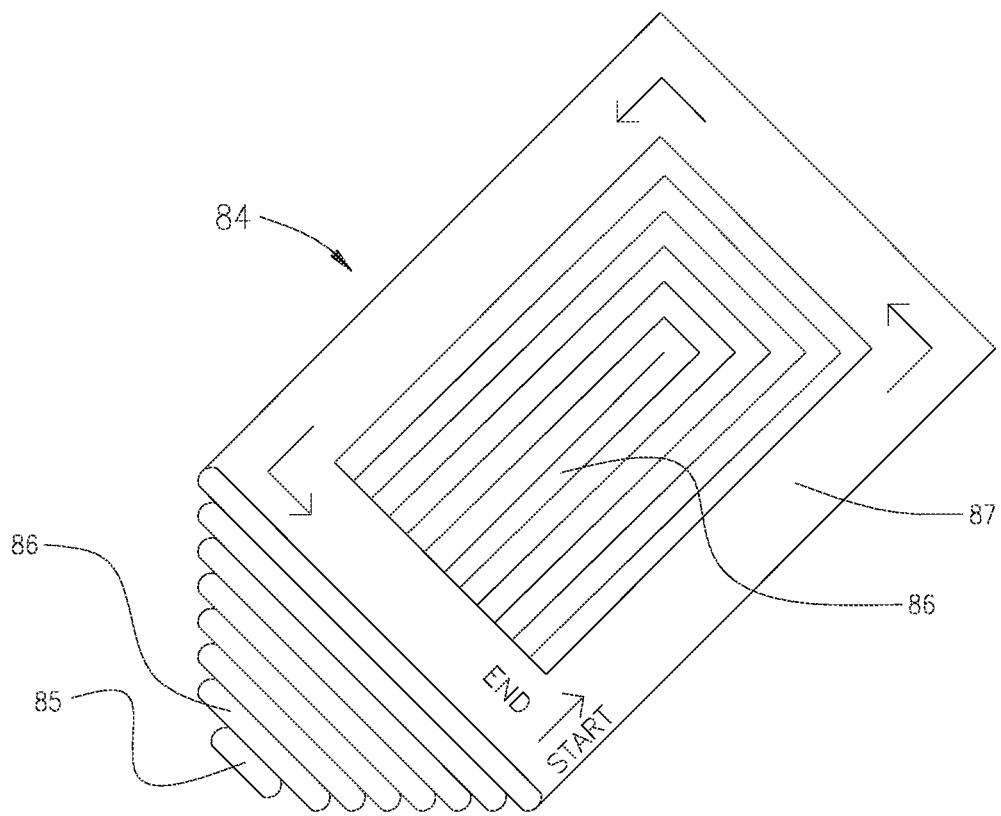
FIG. 8B is a perspective view of a portion of a part which can be deposited on an angled workable, according to one or more aspects of the present disclosure.

FIG. 8B illustrates eight layers, or about half, of box 84 as shown in FIG. 8A. In particular, FIG. 8B illustrates box 84 of FIG. 8A, were box 84 to be sliced diagonally. FIG. 8B also schematically shows an approach for depositing material in a plurality of layers of material to form a part, such as a box, with a hollow interior. For example, during the production of box 84, additive manufacturing apparatus 1 may first form a single straight layer 85 that extends across a portion of the width of a table or other work surface, such as bead board 46. Apparatus 1 may then deposit a second layer 86 and plurality of subsequent layers 87. Layers 86 and 87 may extend across increasing widths of bead board 46, and may be deposited via nozzle 51 on top of the previous layer, such that the newly deposited layer 86 or 87 is supported by the previously-deposited layer. In some aspects, the newly-deposited layer 86 or 87 may cover about 50% of the previously-deposited layer when viewed from nozzle 51.

As shown in FIG. 8B, one or more of layers 86 and/or 87 may be deposited by beginning to place material at a corner of box 84, as identified with "START". Upon reaching the next corner, second layer 86 or layer 87 may be deposited by turning applicator assembly 43 and nozzle 51 approximately 90 degrees. Upon making this turn, applicator assembly 43 and nozzle 51 may move vertically upwards at a 45-degree angle (e.g., parallel to plane 70) until reaching the next corner, after which applicator assembly 43 and nozzle 51 may again turn 90 degrees so as to return across the width to the table, forming a second long side of box 84 opposite to the first long side that extends from the start position "START". Applicator assembly 43 and nozzle 51 may then turn 90 degrees for a third time to print material while moving downward at a 45-degree angle (e.g., parallel to plane 70) to the position where the process began, as identified with "END" in FIG. 8B.

The above-described process may be repeated in a layer-by-layer manner to produce a rectangular enclosed shape at a 45-degree angle. In particular, a first half of box 84 may be formed by depositing material while making progressively longer rectangular layers 87 to a midway point, after which each layer has a smaller width and length, making progressively smaller rectangles to finish the part, box 84. This may complete a printed small enclosed hollow box 84, but could also be used to form differently-shaped and larger parts having a hollow interior (e.g., entirely hollow and absent of any infill). While box 84 is shown with a plurality of rectangular layers, as understood, one or more layers of the part may be formed with curves, and may be different shapes. As a further example, a hollow sphere may be formed by depositing material with additive manufacturing apparatus 1 configured for angled printing. As understood, angled printing, including printing at about a 45-degree angle, may be used to make other enclosed structures, including structures that are free of any support materials and/or structures that have a hollow interior, as described above.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the embodiments described herein are not to be considered as illustrative and exemplary, and not limiting.

What is claimed is:

1. An additive manufacturing apparatus, comprising:
an extruder configured to receive material;
a work surface extending so as to define a plane for receiving one or more layers of the material;
a horizontal surface of a chill plate configured to support the one or more layers of the material after the material is deposited on the work surface;
an applicator assembly secured at a downstream portion of the additive manufacturing apparatus;
a nozzle connected to the applicator assembly, the nozzle being configured to receive the material from the extruder and deposit the material on the work surface; and
an actuator configured to displace the work surface in a movement direction away from the horizontal surface, wherein the movement direction forms an acute angle with the plane.

2. The additive manufacturing apparatus of claim 1, wherein the nozzle extends so as to define a longitudinal axis, the longitudinal axis being angled with the plane.

3. The additive manufacturing apparatus of claim 1, wherein the chill plate is actively cooled.

4. The additive manufacturing apparatus of claim 1, wherein the additive manufacturing apparatus is configured to position the work surface adjacent to a front edge of the chill plate.

5. The additive manufacturing apparatus of claim 1, wherein the acute angle is an angle from about 30 degrees to about 60 degrees.

6. The additive manufacturing apparatus of claim 1, wherein the acute angle is measured from the movement direction upwards and towards an upper portion of the work surface.

7. The additive manufacturing apparatus of claim 1, further including a roller configured to compress the material deposited by the nozzle on the work surface.

8. The additive manufacturing apparatus of claim 7, wherein the acute angle is about 40 degrees to about 50 degrees.

9. The additive manufacturing apparatus of claim 7, wherein the movement direction is a horizontal direction.

10. The additive manufacturing apparatus of claim 7, further including a plate forming a surface that extends in a horizontal plane.

11. An additive manufacturing apparatus, comprising:
an extruder configured to receive and heat material;
an angled work surface extending so as to define a plane for receiving one or more layers of the material;
a chill plate having a horizontal work surface that defines an acute angle with the angled work surface, the acute angle being measured from the angled work surface towards the horizontal work surface;
a nozzle extending in an angled orientation with respect to the horizontal work surface and with respect to a vertical direction such that a longitudinal axis of the nozzle extends orthogonally with respect to the angled work surface; and
an applicator assembly secured at a downstream portion of the additive manufacturing apparatus and connected to the nozzle.

12. The additive manufacturing apparatus of claim 11, wherein a longitudinal axis of the nozzle forms an approximately 45-degree angle with respect to a horizontal direction.

13. The additive manufacturing apparatus of claim 11, further including a compression roller configured to follow the nozzle as the nozzle deposits material in the plane.

14. The additive manufacturing apparatus of claim 11, further including a base plate, the base plate configured to removably secure the angled work surface and configured to removably secure a vertical work surface.

15. An additive manufacturing apparatus, comprising:
an extruder;
an angled work surface extending so as to define a plane for receiving one or more layers of material;
a plate having a horizontal work surface that defines an angle with the angled work surface, the angle being between about 10 degrees and about 80 degrees, as measured towards the angled work surface;
a fastener securing the angled work surface at the angle;
a nozzle extending orthogonally with respect to the plane for depositing the one or more layers of material; and
an applicator assembly secured at a downstream portion of the additive manufacturing apparatus.

16. The additive manufacturing apparatus of claim 15, further including an angled mount connecting the applicator assembly to a carrier of the additive manufacturing apparatus.

17. The additive manufacturing apparatus of claim 15, further including a horizontally-extending base plate connected to the angled work surface.

18. The additive manufacturing apparatus of claim 17, wherein the angled work surface is included in a board formed of a material including fiberboard or plywood.

19. The additive manufacturing apparatus of claim 17, wherein the angled work surface is included in a board connected to the horizontally-extending base plate by an angled table plate.

20. The additive manufacturing apparatus of claim 15, wherein the angle is about 45 degrees.

* * * * *